United States Patent [19]
Syo

[11] Patent Number: 5,880,977
[45] Date of Patent: Mar. 9, 1999

[54] MESH GENERATION DEVICE AND ITS METHOD FOR GENERATING MESHES HAVING A BOUNDARY PROTECTIVE LAYER

[75] Inventor: Toshiyuki Syo, Tokyo, Japan

[73] Assignee: NEC Corporation, Tokyo, Japan

[21] Appl. No.: 824,614

[22] Filed: Mar. 27, 1997

[30] Foreign Application Priority Data

Mar. 28, 1996 [JP] Japan .................................. 8-074982

[51] Int. Cl.⁶ .................................................. G06F 17/50
[52] U.S. Cl. ............................................ 364/578; 364/490
[58] Field of Search ................................ 364/578, 488, 364/489, 490, 491

[56] References Cited

U.S. PATENT DOCUMENTS

| | | | |
|---|---|---|---|
| 4,912,664 | 3/1990 | Weiss et al. | 364/578 |
| 4,933,889 | 6/1990 | Meshkat et al. | 364/578 |
| 4,941,114 | 7/1990 | Shigyo et al. | 364/578 |
| 5,579,249 | 11/1996 | Edwards | 364/490 |
| 5,617,322 | 4/1997 | Yokota | 364/578 |
| 5,677,846 | 10/1997 | Kumashiro | 364/491 |

*Primary Examiner*—Vincent N. Trans
*Assistant Examiner*—Russell W. Frejd
*Attorney, Agent, or Firm*—Foley & Lardner

[57] ABSTRACT

A mesh generation device comprising a boundary protective layer generating unit, a mesh point positioning unit, a triangular mesh generation unit and a triangular mesh checking unit, characterized in that the triangular mesh generating unit generates triangular meshes restrictively in the region where the boundary protective layer may be destroyed by some triangular meshes as the first stage, and generates triangular meshes in the remaining region as the second stage, and that the triangular mesh checking unit checks whether or not the generated triangular meshes are destroying the boundary protective layer after the completion of the processing in the first stage by the triangular mesh generating unit.

14 Claims, 13 Drawing Sheets

(A)　(B)

(C)　(D)

MESH GENERATION DEVICE AND ITS METHOD FOR GENERATING MESHES HAVING A BOUNDARY PROTECTIVE LAYER

BACKGROUNDS OF THE INVENTION

1. Field of the Invention

The present invention, for the use in semiconductor process/device simulation, relates to a mesh generation device and its method for generating meshes in the region of a semiconductor device to be processed, and particularly to a mesh generation device and its method for generating meshes having a boundary protective layer in the vicinity of the boundary of a semiconductor device.

2. Description of the Related Art

In analyzing the manufacturing process of a semiconductor by the use of a process simulator, or analyzing the electrical characteristic of a transistor by the use of a device simulator, it is necessary to solve the partial differential equations such as the diffusion equation of continuity and the Poisson equation in order to obtain an impurity distribution, current density, and the other physical quantity in a semiconductor device to be manufactured.

Since this kind of calculation cannot be solved by the partial differential equation, the calculation is performed by dividing the analysis region into smaller regions and making the partial differential equation discrete. As a discretization method of the partial differential equation, generally used is a method of generating triangular meshes having a superior configuration fit so as to divide the analysis region into smaller triangle regions, because the triangular mesh can represent a complicated configuration of a semiconductor accurately.

However, a large problem arises when this triangular mesh is used in the simulation of the MOSFET. This is why the same current flows parallel along the boundary $Si$—$SiO_2$ in the MOSFET. This means that the current flows at the mesh edge on the boundary in the device simulation. In an arbitrarily formed triangular mesh, however, the cross section at the mesh edge on the boundary is too irregular to express the same current parallel along the boundary $Si$—$SiO_2$, which causes a problem in that an accurate simulation cannot be performed.

In order to solve the problem, generating a local orthogonal mesh, in other words, a boundary protective layer, instead of a triangular mesh, is effective in making constant the cross section at the mesh edge on the boundary. A method of eliminating parasitic resistance caused by a mesh through the generation of the boundary protective layer, is disclosed in, for example, the article "A Triangular Mesh Generation Method Suitable for the Analysis of Complex MOS Device Structures" (written by Kumashiro/Yokota, NUPAD V, pp. 167–170), and Japanese Patent Publication Laid-Open (Kokai) No. Heisei 7-161962 "A Mesh Generation Method".

A mesh generation method of generating meshes having the boundary protective layer, according to the conventional technique, will be described below. FIG. 10 is a flow chart showing an operation for generating meshes having the boundary protective layer according to the conventional technique.

With reference to FIG. 10, a boundary protective layer is generated at first, which is formed by orthogonal meshes locally conformed to a boundary segment forming a boundary (Step 901). An example of the boundary protective layer generation is illustrated in FIG. 11 (A). Mesh points are located within the region distant from the generated boundary protective layer by at least a predetermined reference distance (Step 902). An example of the mesh point positioning is illustrated in FIG. 11 (B).

Next, mesh points are combined with each other, so as to generate triangular meshes (Step 903). An example of the triangular mesh generation is illustrated in FIG. 11 (C). In order to generate a triangular mesh, use is made of a method of selecting a mesh point so that a probable angle made by the branch and the mesh point may become maximum at the time of connecting the mesh point of the end points of a branch to be noted (hereinafter, referred to as a "notable branch") with a mesh point in the vicinity of the branch. This method is, hereafter, referred to as a "probable angle maximizing method", which is disclosed in Japanese Patent Publication Laid-Open (Kokai) No. Heisei 7-219977 "A Mesh Generation Method".

The "probable angle maximizing method" will be briefly described with reference to FIG. 13.

As illustrated in FIG. 13, when a segment A11–B11 is regarded as the notable branch, with four possible mesh points C11, D11, E11, F11 to be connected to the notable branch, each mesh point of C11, D11, E11, F11, and the mesh points A11 and B11 that are endpoints of the notable branch are connected temporarily so to select a mesh point so that its probable angle may be maximum.

The "probable angle" means ∠A11C11B11, for example, with regard to the mesh point C11. Since the chord A11B11 is in common, if one selects a mesh point such that a radius of a circumscribed circle of a triangle (triangular mesh) formed by the chord A11B11 and the mesh point is a minimum, the "probable angle" becomes a maximum. Therefore, in the case of FIG. 13, the "probable angle" becomes maximum when the chord is connected to the mesh point C11. Since the mesh point with a minimum radius of the circumscribed circle is selected, none of the other mesh points is contained within ΔA11B11C11. Therefore, the Delaunay division can be performed efficiently. The triangular meshes can be generated on the region to be processed in a spiral shape from the peripheral portion toward the inside of the region.

After generating the triangular meshes in the above way, a triangular mesh that destroys the boundary protective layer is searched out of the generated triangular meshes (Step 904). When there exists a triangular mesh that destroys the boundary protective layer, a mesh point within the region, of the triangular mesh points destroying the boundary protective layer, is projected on the boundary segment and the projected point is added as a new mesh point (Step 905). An example of the new mesh point addition is illustrated in FIG. 11 (D). Returning to Step 901, the process of Steps 901 to 905 will be performed repeatedly until no new projected point is generated.

When there exists no triangular mesh that destroys the boundary protective layer in Step 904, all the process of generating the meshes having the boundary protective layer is finished. An example of the meshes generated in the above way is illustrated in FIG. 12.

As mentioned above, it is possible to make constant the cross section of the boundary of the control volume in the normal direction by generating the meshes having the boundary protective layer in the region of the semiconductor device. Therefore, inversion layer current can be accurately calculated on the MOSFET having the boundary $Si$—$SiO_2$ in any direction, without generating parasitic resistance caused by meshes.

The above conventional mesh generating method, however, has the following defects.

In the conventional mesh generating method, a search for a triangular mesh that destroys the boundary protective layer is made after the completion of generating the triangular meshes within the region. When some of the generated ones destroy the boundary protective layer, the generated triangular meshes are all destroyed, and the mesh generation is retried after the first step. If all the triangular generation is retried every time a triangular mesh destroying the boundary protective layer is detected, the other triangular meshes impossible to destroy the boundary protective layer, like the triangular meshes within the region, are also to be generated repeatedly, which causes unnecessary processing.

In the mesh generation processing, the time spent on the processing is increased according to the increase in the number of the mesh points. Therefore, the repetition of the above useless process wastes much time, thereby deteriorating the efficiency.

SUMMARY OF THE INVENTION

The present invention is to provide a mesh generation device and a mesh generation method, improved in efficiency, capable of speeding up the generation processing of triangular meshes having a boundary protective layer.

According to the first aspect of the invention, a mesh generation device for generating meshes in the region of a semiconductor device to be processed, comprises a boundary protective layer generating means for generating a boundary protective layer and positioning necessary mesh points in the vicinity of the boundary in the semiconductor device, a mesh point positioning means for generating mesh points within the region of the semiconductor device at the position apart from the boundary protective layer by a predetermined reference distance and further, a triangular mesh generating means for generating triangular meshes through the connection between the mesh points positioned by the boundary protective layer generating means and the mesh point positioning means, and a triangular mesh checking means for checking whether or not the triangular meshes generated by the triangular mesh generating means destroy the boundary protective layer, in which the triangular mesh generating means performs the generation processing of the triangular meshes with it divided into two stages, generates the triangular meshes restrictively in the region where the boundary protective layer may be destroyed by some triangular meshes, as the first stage of processing, and generates the triangular meshes in the remaining region as the second stage of processing, and the triangular mesh checking means checks whether or not the generated triangular meshes are destroying the boundary protective layer after the completion of the processing in the first stage by the triangular mesh generating means.

In the preferred construction, when it is judged that a triangular mesh destroying the boundary protective layer exists as the result of checking by the triangular mesh checking means, the boundary protective layer generating means projects the mesh point which does not form the boundary protective layer, of the mesh points of the triangular mesh, on the boundary protective line forming the boundary protective layer, so to set a new mesh point, and when a new mesh point is set by the boundary protective layer generating means, the triangular mesh generating means destroys the triangular meshes to be checked by the triangular mesh checking means and generates triangular meshes newly according to the processing of the first stage.

In the preferred construction, the triangular mesh generating means, as the first stage of processing, selects a branch to set the activity one after another in a spiral way from any branch forming the boundary segment on the boundary of the semiconductor device toward the inside, restrictively in the region where the boundary protective layer may be destroyed by some triangular meshes, and generates triangular meshes including the selected branches one after another until there exists no branch with the activity set thereon.

In another preferred construction, the triangular mesh generating means, as the first stage of processing, selects a branch one after another in a spiral way from any branch forming the boundary segment on the boundary of the semiconductor device toward the inside, and generates triangular meshes including the selected branches one after another until the first generation of the triangular meshes including none of the mesh points forming the boundary protective layer.

In another preferred construction, the mesh point positioning means positions mesh points in the vicinity of a sub-domain point on a given condition determined according to the type of the sub-domain point and the structure of the boundary protective layer.

Also, the mesh point positioning means positions mesh points in the vicinity of a sub-domain point on a given condition determined according to the type of the sub-domain point and the structure of the boundary protective layer, and the triangular mesh generating means, as the first stage of processing, selects a branch one after another in a spiral way from any branch forming the boundary segment on the boundary of the semiconductor device toward the inside, and generates triangular meshes including the selected branches one after another until the first generation of the triangular meshes including none of the mesh points forming the boundary protective layer.

According to the second aspect of the invention, a mesh generation method executed by a mesh generation device comprising a boundary protective layer generating means for setting a boundary protective layer consisting of local orthogonal meshes and positioning necessary mesh points in the vicinity of a boundary of a semiconductor device to be processed, a mesh point positioning means for positioning mesh points within the region surrounded by the boundary protective layer of the semiconductor device, a triangular mesh generating means for generating triangular meshes by connecting the mesh points together, and a triangular mesh checking means for checking whether or not the generated triangular meshes destroy the boundary protective layer, the method comprising;

a first step of the boundary protective generation means generating the boundary protective layer and positioning necessary mesh points in the vicinity of the boundary of the semiconductor device, a second step of the mesh point positioning means generating mesh points within the region of the semiconductor device at the position apart from the boundary protective layer by a predetermined reference distance and further, a third step of the triangular mesh generating means generating triangular meshes through the connection between the mesh points positioned by the boundary protective layer generating means and the mesh point positioning means, restrictively in the region where the boundary protective layer may be destroyed by some triangular meshes, a fourth step of the triangular mesh checking means checking whether the triangular meshes generated by the triangular mesh generating means are destroying the boundary protective layer, and a fifth step of the triangular mesh generating means generating triangular meshes in the remaining region of the semiconductor device in the case of no detection of any triangular meshes destroying the boundary protective layer as the result of checking by the triangular mesh checking means.

In the above-mentioned construction, a mesh generation method further comprises a sixth step in which, when a triangular mesh destroying the boundary protective layer is detected as the result of checking by the triangular mesh checking means, the boundary protective layer generating means projects the mesh point which does not form the boundary protective layer, of the mesh points of the detected triangular mesh, on the boundary protective line forming the boundary protective layer, so to set a new point, the method in which the process from the first step is repeated after executing the sixth step.

In the preferred construction, the third step by the triangular mesh generating means comprises, a step of selecting a branch to set the activity one after another in a spiral way from any branch forming the boundary segment on the boundary of the semiconductor device toward the inside, restrictively in the region where the boundary protective layer may be destroyed by some triangular meshes, a step of generating triangular meshes including the selected branches, and a step in which it is judged whether or not there remain the branches with the activity set thereon, if there remain, the process is returned to the step of generating triangular meshes, and alternatively, if not, the generation processing of the triangular meshes has been completed.

In another preferred construction, the third step by the triangular mesh generating means comprises, a step of selecting a branch one after another in a spiral way from any branch forming the boundary segment on the boundary of the semiconductor device toward the inside, a step of generating triangular meshes including the selected branches, and a step in which it is judged whether or not there are generated the triangular meshes each including no mesh point forming the protective boundary layer, if such triangular meshes are not generated, the process is returned to the step of generating triangular meshes, and alternatively, if generated, the generation processing of the triangular meshes has been completed.

According to another aspect of the invention, a COMPUTER READABLE MEMORY storing a computer program controlling a computer system which realizes a mesh generation device comprising a boundary protective layer generating means for setting a boundary protective layer consisting of local orthogonal meshes and positioning necessary mesh points in the vicinity of a boundary of a semiconductor device to be processed, a mesh point positioning means for positioning mesh points within the region surrounded by the boundary protective layer of the semiconductor device, a triangular mesh generating means for generating triangular meshes by connecting the mesh points together, and a triangular mesh checking means for checking whether or not the generated triangular meshes destroy the boundary protective layer, wherein the computer program comprises;

a first step of the boundary protective generation means generating the boundary protective layer and positioning necessary mesh points in the vicinity of the boundary of the semiconductor device, a second step of the mesh point positioning means generating mesh points within the region of the semiconductor device at the position apart from the boundary protective layer by a predetermined reference distance and further, a third step of the triangular mesh generating means generating triangular meshes through the connection between the mesh points positioned by the boundary protective layer generating means and the mesh point positioning means, restrictively in the region where the boundary protective layer may be destroyed by some triangular meshes, a fourth step of the triangular mesh checking means checking whether the triangular meshes generated by the triangular mesh generating means are destroying the boundary protective layer, and a fifth step of the triangular mesh generating means generating triangular meshes in the remaining region of the semiconductor device in the case of no detection of any triangular meshes destroying the boundary protective layer as the result of checking by the triangular mesh checking means.

In the preferred construction, further comprises a sixth step in which, when a triangular mesh destroying the boundary protective layer is detected as the result of checking by the triangular mesh checking means, the boundary protective layer generating means projects the mesh point which does not form the boundary protective layer, of the mesh points of the detected triangular mesh, on the boundary protective line forming the boundary protective layer, so to set a new point, the program in which the process from the first step is repeated after executing the sixth step.

In another preferred construction, the third step by the triangular mesh generating means comprises, a step of selecting a branch to set the activity one after another in a spiral way from any branch forming the boundary segment on the boundary of the semiconductor device toward the inside, restrictively in the region where the boundary protective layer may be destroyed by some triangular meshes, a step of generating triangular meshes including the selected branches, and a step in which it is judged whether or not there remain the branches with the activity set thereon, if there remain, the process is returned to the step of generating triangular meshes, and alternatively, if not, the generation processing of the triangular meshes has been completed.

In another preferred construction, the third step by the triangular mesh generating means comprises, a step of selecting a branch one after another in a spiral way from any branch forming the boundary segment on the boundary of the semiconductor device toward the inside, a step of generating triangular meshes including the selected branches, and a step in which it is judged whether or not there are generated the triangular meshes each including no mesh point forming the protective boundary layer, if such triangular meshes are not generated, the process is returned to the step of generating triangular meshes, and alternatively, if generated, the generation processing of the triangular meshes has been completed.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
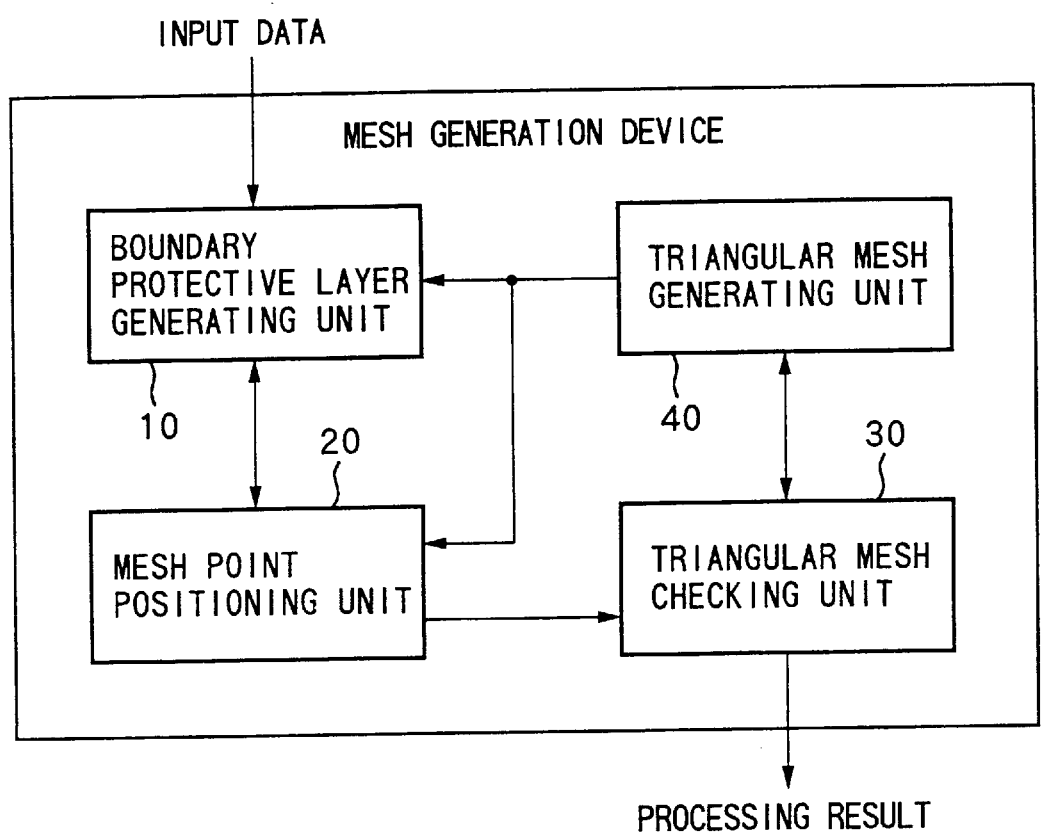
FIG. 1 is a block diagram showing a constitution of a mesh generation device according to an embodiment of the present invention.

FIG. 1 is a block diagram showing a constitution of a mesh generation device according to an embodiment of the present invention.

As illustrated in FIG. 1, the mesh generation device of the embodiment comprises a boundary protective layer generating unit 10 for setting a boundary protective layer, that is of local orthogonal meshes, in the vicinity of the boundary of a semiconductor device to be processed and positioning necessary mesh points there, a mesh point positioning unit 20 for positioning the mesh points within the region surrounded by the boundary protective layer of the semiconductor device, a triangular mesh generating unit 30 for generating triangular meshes by connecting the mesh points with each other, and a triangular mesh checking unit 40 for checking whether some of the generated triangular meshes destroy the boundary protective layer. FIG. 1 shows only the characteristic components of the embodiment, while the description of the other general components are omitted therefrom.

The embodiment is constituted by the use of a computer system. Each component is realized by, for example, a CPU controlled by a program, and a memory and other storage for storing the computer program and data. The computer program is stored into a magnetic disk or other storage medium, to be provided in the system.

The boundary protective layer generating unit 10 generates the boundary protective layer formed by the orthogonal meshes locally conformed to the boundary segment forming the boundary, in the vicinity of the boundary of a semiconductor device to be processed, according to a predetermined rule. The rule for generating the boundary protective layer and the generation method thereof in the conventional technique may be adopted also in this embodiment. The boundary protective layer generating unit 10 positions only the mesh points forming a boundary protective layer (hereinafter, referred to as "boundary protective points"), but does not perform mesh generation. The mesh generation including the boundary protective points is performed by the triangular mesh generating unit 30.

The boundary protective layer generating unit 10, depending on the necessity, positions a new mesh point at a desired segment on the boundary protective layer where the triangular meshes have been already generated. As described later, when the boundary protective layer is destroyed by some of the triangular meshes, a mesh point of the triangular mesh destroying the boundary protective layer is projected on the segment forming the boundary protective layer, which is regarded as a new mesh point on the boundary protective segment. When the mesh point is newly positioned there, the triangular mesh generation is performed by the triangular mesh generating unit 30 again.

The mesh point positioning unit 20 positions mesh points at the location distant from the boundary protective layer (boundary protective points at the present time) generated by the boundary protective layer generating unit 10 by at least a reference distance (these mesh points are, hereinafter, referred to as "within-region mesh points"). The "reference distance" means the minimum distance prohibiting that the within-region mesh points may be positioned from the boundary protective layer. The "reference distance", which is defined as "$\gamma_{normal}$", is obtained by, for example, the following equation (1);

$$\gamma_{normal} = Num \times d + \epsilon \tag{1}$$

Where "$\gamma_{normal}$" is the distance from the boundary segment, "Num" indicates the number of the boundary protective layers, "d" indicates the thickness per one layer in the boundary protective layer, and "$\epsilon$" indicates the shortest distance at which a mesh point should be away from the boundary protective layer.

However, when the mesh point is a sub-domain point, in the configuration of the semiconductor device, it is impossible to perform a compensation processing of the triangular meshes destroying the boundary protective layer as described later. Accordingly, the mesh point positioning unit 20 previously eliminates the mesh points, like the sub-domain point, existing at the position where a triangular mesh destroying the boundary protective layer may be created. Hereinafter, the condition of eliminating the mesh points creating a triangular mesh destructive to the boundary layer will be described, by way of example, in the case where the boundary protective layer consists of one layer and in the case where it consists of two layers.

Figure 8:
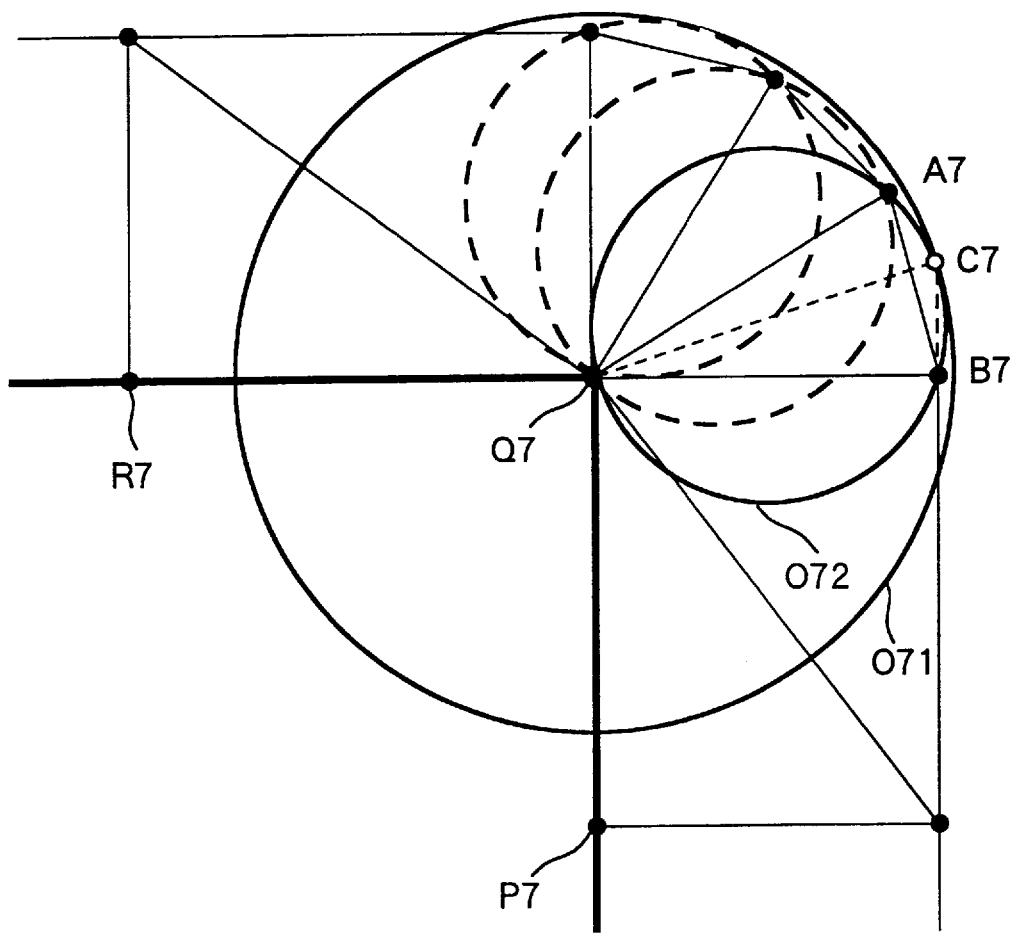
FIG. 8 is a view for use in describing the condition on the position of a mesh point in the vicinity of the sub-domain point in the case where the boundary protective layer consist of one layer.

At first, the description will be made with reference to FIG. 8 in the case where the boundary protective layer consists of one layer. In FIG. 8, the segment P7-Q7-R7 is regarded as a material boundary, and the points A7 and B7 are regarded as boundary protective points generated from the sub-domain point Q7. In this case, a triangular mesh, if it is ΔQ7A7B7, does not destroy the boundary protective layer. However, when there exists the within-region mesh point C7 within the circumscribed circle O72 of ΔQ7A7B7, the mesh point C7 is selected to generate a triangular mesh such as Δ Q7C7B7 according to the triangular mesh generation by the use of the probable angle maximizing method. This triangular mesh destroys the boundary protective layer.

In order to prevent creating a triangular mesh that destroys the boundary protective layer, it is necessary to prevent positioning a mesh point within the circumscribed circle O72 of ΔQ7A7B7. As a simple method, assuming a circle O71 containing the circumscribed circle O72, no mesh point but the mesh points forming the boundary protective layer should be arranged to be existed in the circle O71.

Figure 9:
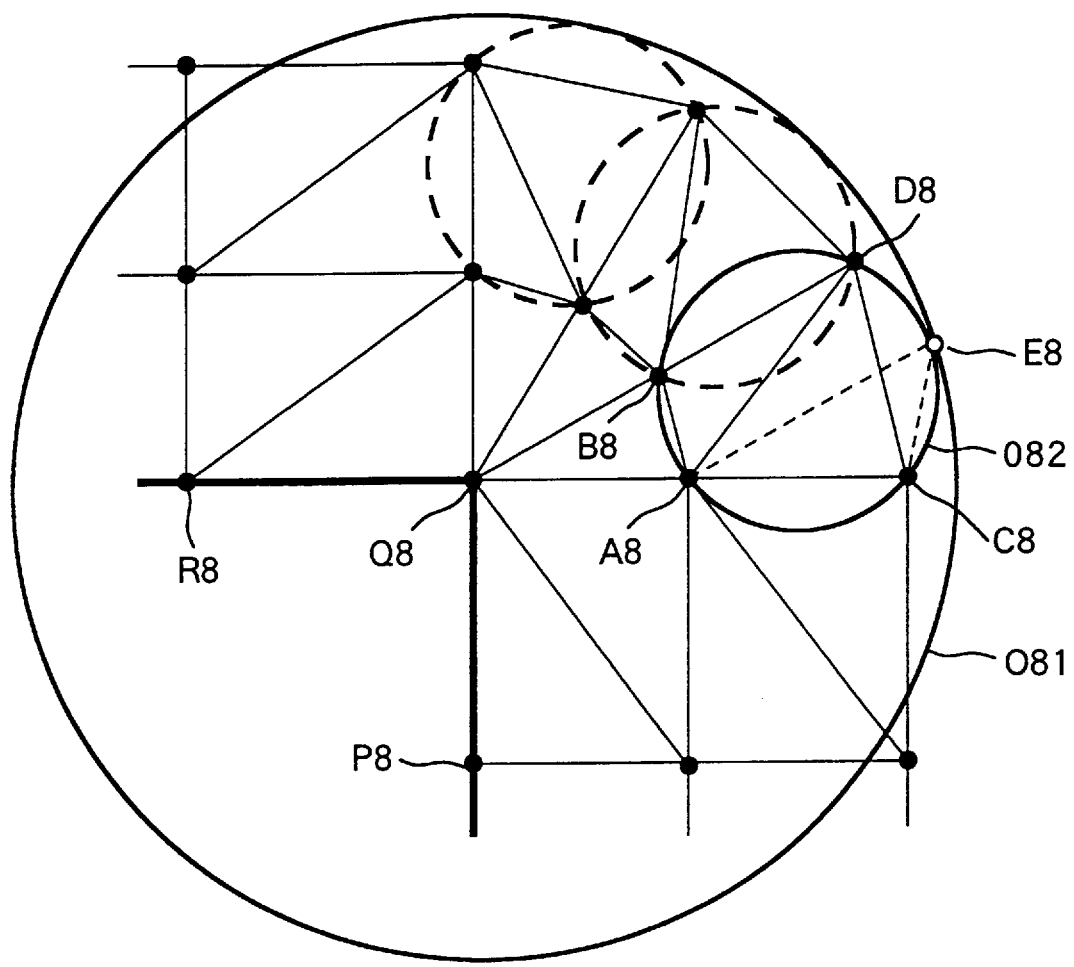
FIG. 9 is a view for use in describing the condition on the position of a mesh point in the vicinity of the sub-domain point in the case where the boundary protective layer consist of two layers.
Figure 10:
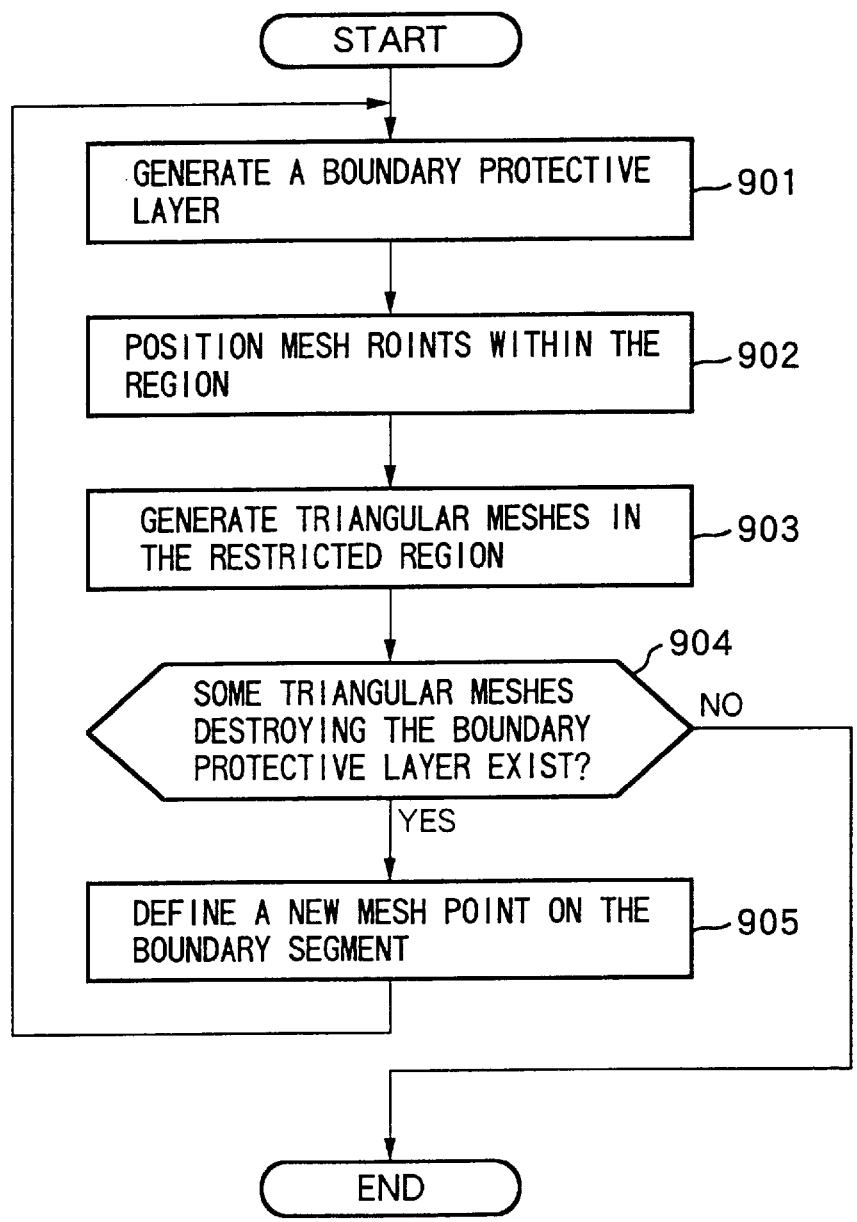
FIG. 10 is a flow chart showing the conventional mesh generation method.
Figure 11:
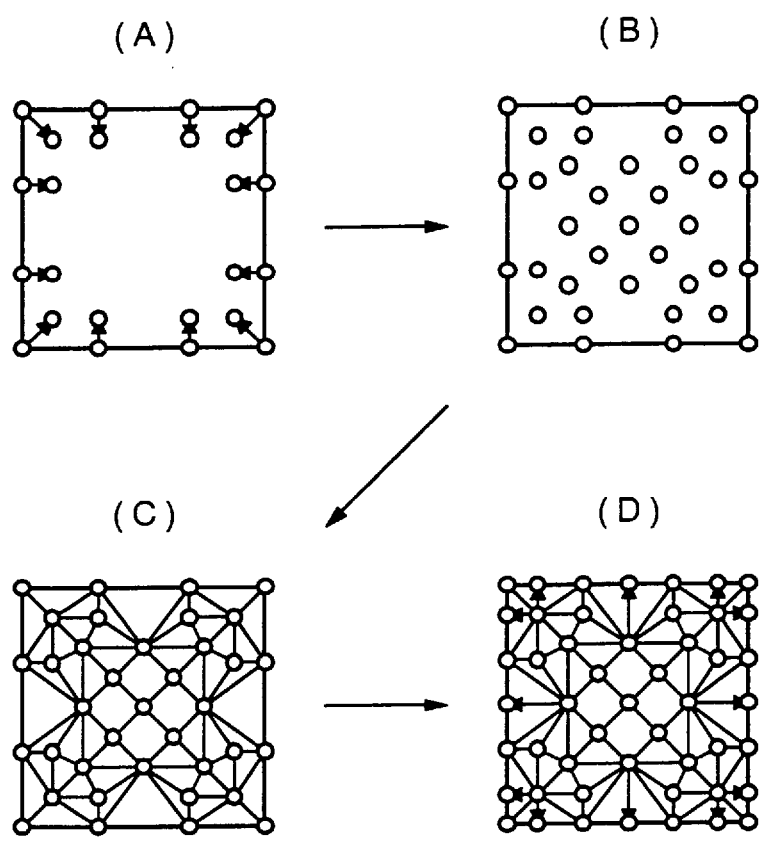
FIG. 11 is a view showing the process of the mesh generation in FIG. 10.

Next, the description will be made with reference to FIG. 9 in the case where the boundary protective layer consists of two layers. Also, in the case of FIG. 9 where "the boundary protective layer consists of two layers", the segment P8-Q8-R8 is regarded as the material boundary, and the points A8, C8, B8, D8 are regarded as the boundary protective points generated from the sub-domain point Q8, similarly to the case of FIG. 8 where "the boundary protective layer consists of one layer". The boundary protective points A8, C8, B8, D8 all exist on the circle O82 as indicated in FIG. 9. If a mesh point such as the point E8 exists on the circle O82 or in the circle O82, the triangular mesh such as Δ A8C8E8 is generated, according to the triangular mesh generation by the use of the probable angle maximizing method. This triangular mesh destroys the boundary protective layer.

Also in this case, it is necessary to prevent from positioning the mesh point within the region of the circumscribed circle O82 similarly to the above-mentioned case where the boundary protective layer consists of one layer, or as a simple method, assuming the circle O81 containing the circumscribed circle O82, no mesh point but the mesh points forming the boundary protective layer should be arranged to be existed in the circle O81. The radius of the circle O81, which is defined as "$\gamma_{boundary}$", is obtained by the following equation (2);

$$\gamma_{boundary} = \frac{1}{2} d \left[ \frac{2Num - 1}{\cos\frac{\theta}{2}} + \sqrt{1 + \left\{ (2Num - 1)\tan\frac{\theta}{2} \right\}^2} \right] + \epsilon \tag{2}$$

Where "$\theta$" is the interior angle formed by connecting the sub-domain point with the adjacent mesh points on the boundary protective layer.

If no mesh point is to be arranged within the circle O81 determined by the use of the equation (2), it is possible to prevent the generation of the triangular meshes which destroys the boundary protective layer generated from the sub-domain point.

The triangular mesh generating unit 30 generates triangular meshes by connecting the mesh points with each other (including both the boundary protective points and the within-region mesh points) which are arranged within the region of the semiconductor device to be processed. The triangular mesh generation is divided into two stages. Namely, in the first stage, the triangular meshes are restrictively generated on the boundary protected layer and in the region where the boundary protective layer may be destroyed by some triangular meshes. In other words, the triangular meshes having the boundary protective points are generated according to the processing of the first stage. If the triangular mesh checking unit 40 as will be described later, then makes a judgement that none of the triangular meshes destroys the boundary protective layer, the triangular meshes are generated in the remaining region by connecting the remaining within-region mesh points with each other, as the second stage. The method of generating the triangular meshes restrictively in the region where the boundary protective layer may be destroyed, will be explained as follows.

The triangular mesh checking unit 40 is to search the triangular mesh destroying the boundary protective layer, after the triangular mesh generating unit 30 has generated the triangular meshes in the region where the boundary protective layer may be destroyed, through the process of the first stage. Whether or not the boundary protective layer is being destroyed by the triangular mesh depends on the existence of a branch connecting the boundary protective point with the within-region mesh point, of the branches that are sides of the triangular mesh. That is to say, the presence of such a branch indicates that the boundary protective layer has been destroyed by the triangular mesh having the branch as one side. The absence of such a branch indicates that there exists no triangular mesh destroying the boundary protective layer. The boundary protective point to be judged here is other than the boundary protective point arranged in the most inner side of the boundary protective layer. Because, since the branch connecting together the boundary protective points arranged in the most inner side of the boundary protective layer indicates the inner limit of the boundary protective layer, the existence of the within-region mesh point connected to other boundary protective point shows that the triangular mesh is being generated out of the inner limit of the boundary protective layer.

Figure 2:
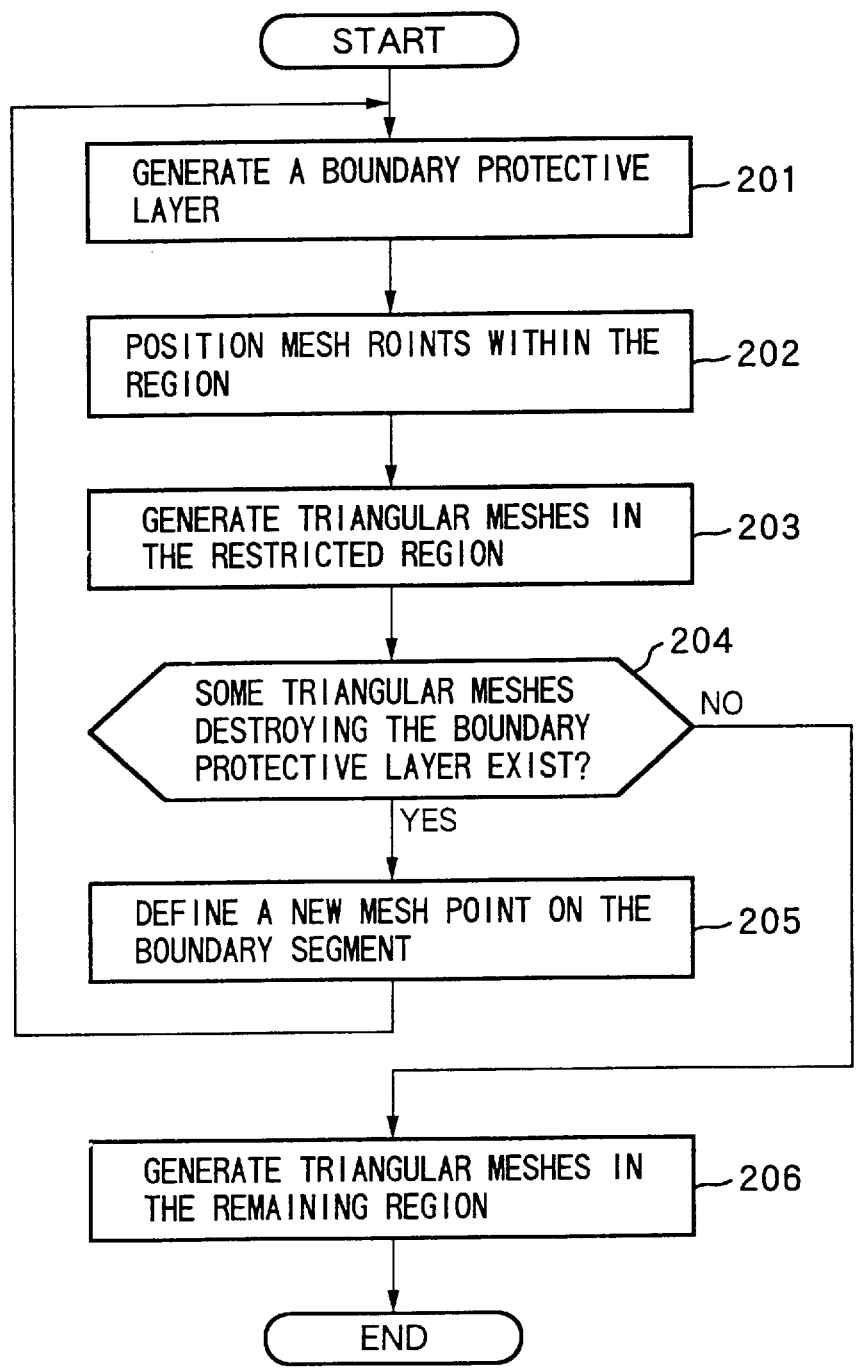
FIG. 2 is a flow chart showing an operation of the embodiment.

This time, an operating of this embodiment will be described. FIG. 2 shows a flow chart showing the processing of the triangular mesh generation according to the embodiment.

Figure 3:
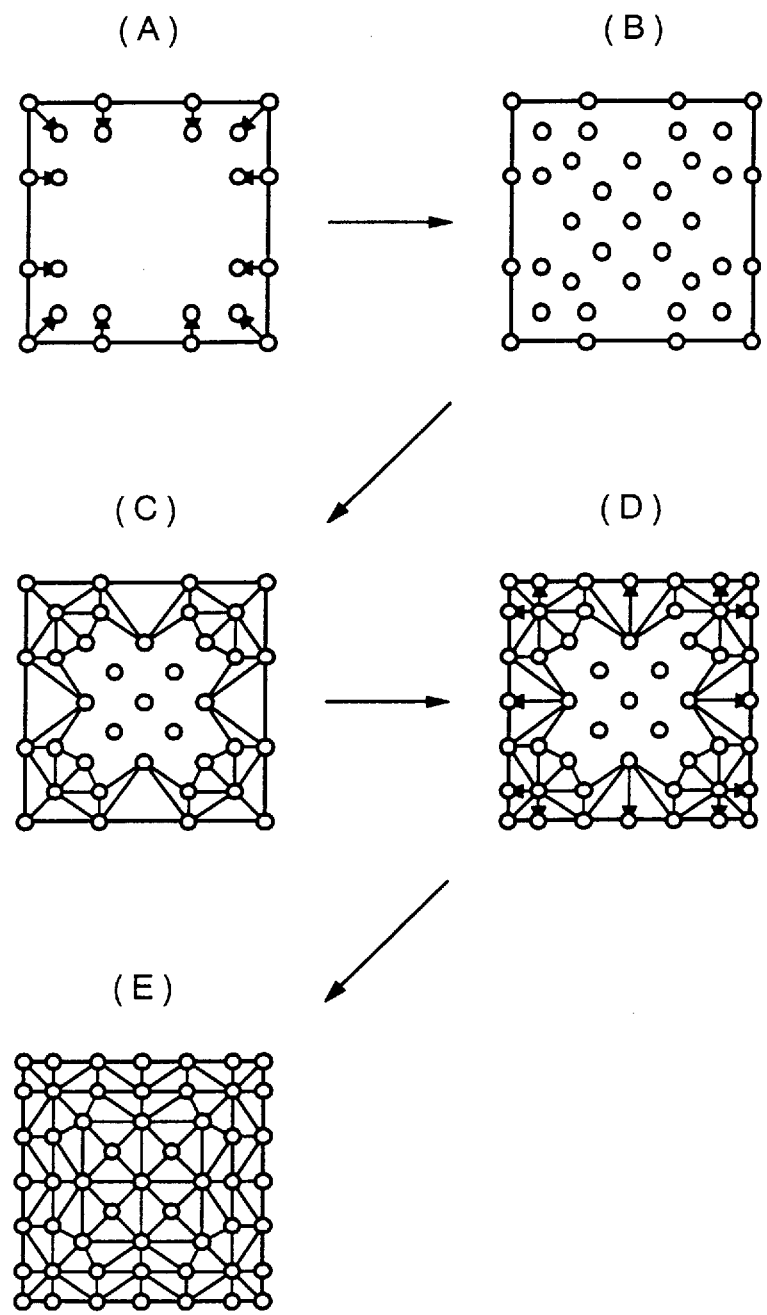
FIG. 3 is a view showing the process of the mesh generation in FIG. 2.

With reference to FIG. 2, the boundary protective layer generating unit 10 generates the boundary protective layer in the vicinity of the boundary line forming the semiconductor device to be processed (Step 201). An example of the boundary protective layer generation is illustrated in FIG. 3 (A).

The mesh point positioning unit 20 positions mesh points within the region at a minimum of reference distance apart from the boundary protective layer generated by the boundary protective layer generating unit 10 (Step 202). An example of the mesh point positioning is illustrated in FIG. 3 (B). The reference distance is obtained from the above-mentioned equation (1). As mentioned above, the mesh points other than the mesh points forming the boundary protective layer, i.e., the within-region mesh points are eliminated from the region in the vicinity of the sub-domain point in a certain range.

The triangular mesh generating unit 30 generates triangular meshes restrictively in the region where the boundary protective layer may be destroyed (Step 203) as the process of the first stage. An example of the triangular mesh generation is illustrated in FIG. 3 (C).

The triangular mesh checking unit 40 makes a judgment whether or not there exists a triangular mesh destroying the boundary protective layer, of the triangular meshes generated in the restrictive region in Step 203 (Step 204). If a triangular mesh destroying the boundary protective layer is detected, the mesh point positioning unit 20 projects the within-region mesh point of the triangular mesh on the boundary segment, so to define a new mesh point on the boundary segment (Step 205). An example of the new mesh point definition is illustrated in FIG. 3 (D). Since the mesh point is newly inserted on the boundary segment, it is necessary to regenerate the boundary protective layer generated by the mesh point on the boundary segment. Therefore, the process from Step 201 is to be performed again.

If there exists no triangular mesh destroying the boundary protective layer, or in the case where the triangular meshes destroying the boundary protective layer have been completely eliminated by the repetition of the process from Step 201 through Step 205, the triangular mesh generating unit 30 generates the triangular meshes in the remaining region of the semiconductor device by connecting all the mesh points together, as the process of the second stage (Step 206). An example of the result of generating triangular meshes is illustrated in FIG. 3 (E).

As described above, according to the mesh generation processing of this embodiment, the region where the boundary protective layer may be destroyed is restricted, and the triangular meshes are generated in the restricted region by the triangular mesh generating unit 30, as the process of the first stage. The triangular mesh checking unit 40 checks whether the boundary protective layer is destroyed by some of the triangular meshes in this region. Accordingly, even if the generation of the boundary protective layer and the triangular mesh should be retried because of the detection of the triangular mesh destroying the boundary protective layer, only the boundary protective layer and the triangular meshes on the restricted region are to be regenerated. Therefore, it is not necessary to repeat the triangular mesh generation in the region where the boundary protective layer cannot be destroyed, unlike the conventional technique, thereby to shorten the time spent on the mesh generation.

This time, an operation of the first stage, according to the triangular mesh generating unit 30, will be described. The operation of generating the triangular meshes restrictively in the region where the boundary protective layer may be destroyed, will be described (refer to Step 203 of FIG. 2).

Figure 4:
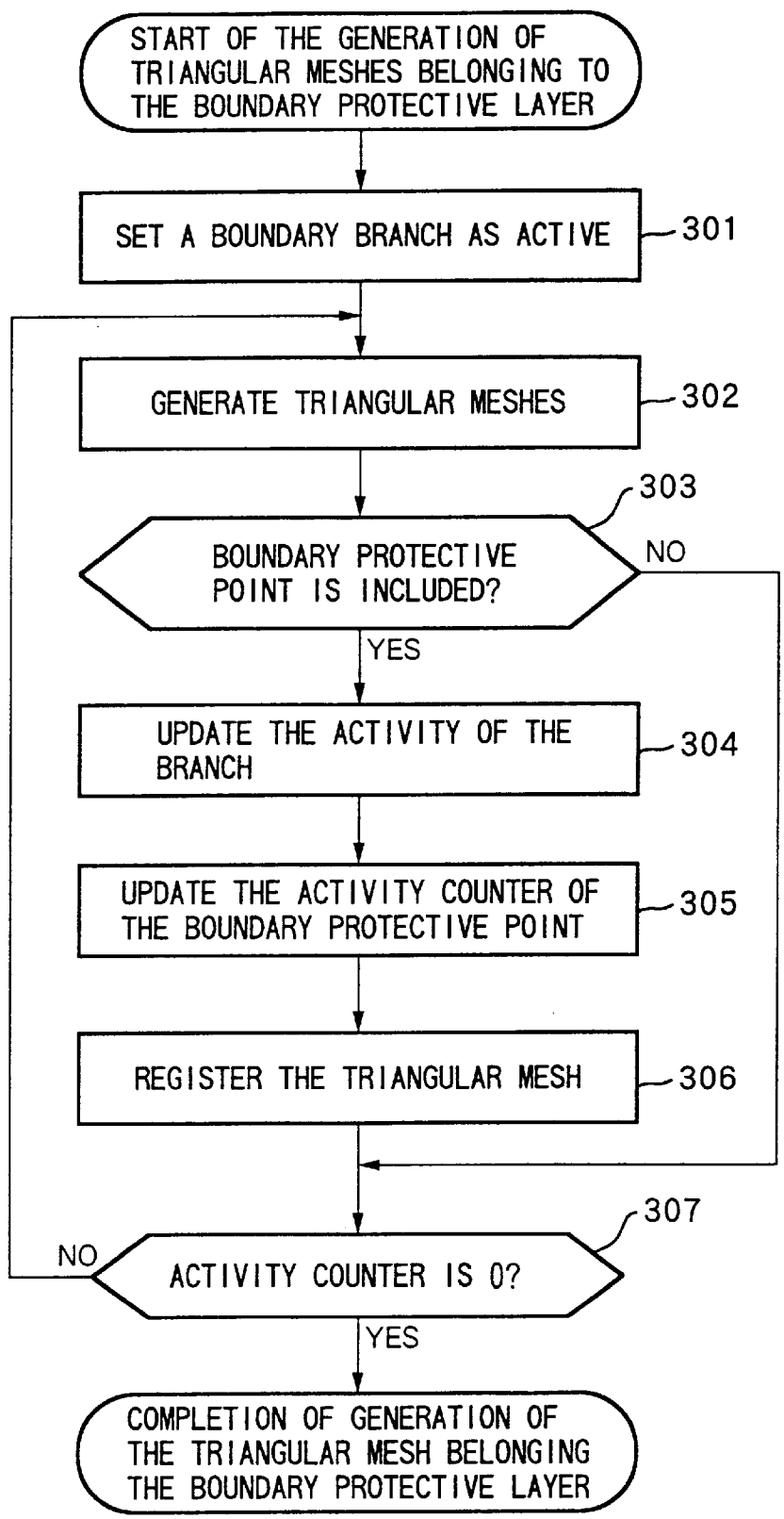
FIG. 4 is a flow chart showing an example of a mesh generation method of the embodiment.

FIG. 4 is a flow chart indicating an example of the operation of generating the triangular meshes restrictively in the region where the boundary protective layer may be destroyed, according to the embodiment. In this example of the operation, the triangular mesh generation is repeated by the use of the activity that is set for each branch forming each side of a triangular mesh, until the generation of the triangular meshes including the mesh points forming the boundary protective layer has been completed. The activity is an index indicating whether or not a triangular mesh can be generated by connecting a branch with a mesh point. When the triangular mesh can be generated, it is set as active. The number of branches set as active is shown in the count value of the activity counter. For example, when the triangular meshes are generated on all over the region, the count value of the activity counter goes to "0".

Referring to FIG. 4, any branch forming the boundary segment on the material boundary is selected so as to be set as active (Step 301). The branches to be set as active are at the initial position for generating the triangular meshes, that is, the starting position for generating the triangular meshes in a spiral way from the end portion of the region toward the inside portion thereof.

Then, each triangular mesh is generated by connecting the adjacent mesh point with the branch set as active by the use of the "probable angle maximizing method" (Step 302). Since the starting position of the triangular mesh generation is located at the outer peripheral portion of the region for generating the triangular meshes, the triangular mesh can be generated in a spiral way from the outer peripheral portion toward the inner portion of the region.

It is judged whether or not the generated triangular meshes contain a boundary protective point (Step 303). If a triangular mesh contains the boundary protective point, the triangular mesh exists within the region where the boundary protective layer may be destroyed. The triangular mesh is registered as a triangular mesh to be checked in the process after Step 304.

More specifically, the mesh point and the activity of the branch for use in the triangular mesh, and the counter value of the activity counter of the boundary protective points are updated (Steps 304 and 305). Subsequently, the triangular mesh including a boundary protective point is registered as the subject to be judged whether or not it is destroying the boundary protective layer (Step 306).

On the other hand, when the triangular meshes include no boundary protective point, the triangular meshes have no possibility of destroying the boundary protective layer. Therefore, it goes to Step 307 without registering any triangular meshes.

When it is judged that the generated triangular meshes contain no boundary protective point (Step 303), or when a triangular mesh has been registered as the subject to be judged (Step 306), the presence of the boundary protective point whose activity counter value is not "0", is checked (Step 307). If the update process of Steps 304 and 305 has been performed, the counter value of the activity counter after the update is naturally to be checked. When there exists the boundary protective point whose active counter value is not "0", the process is repeated from Step 302 to Step 306 until all the activity counters of the boundary protective points become "0". When all the activity counters of the branches including the boundary protective points become "0", the triangular mesh generation will be completed.

In this way, all the triangular meshes including the boundary protective points can be properly generated through the repetition of the triangular mesh generation until the branch set as active disappears in the region where some triangular meshes may destroy the boundary protective layer.

Figure 5:
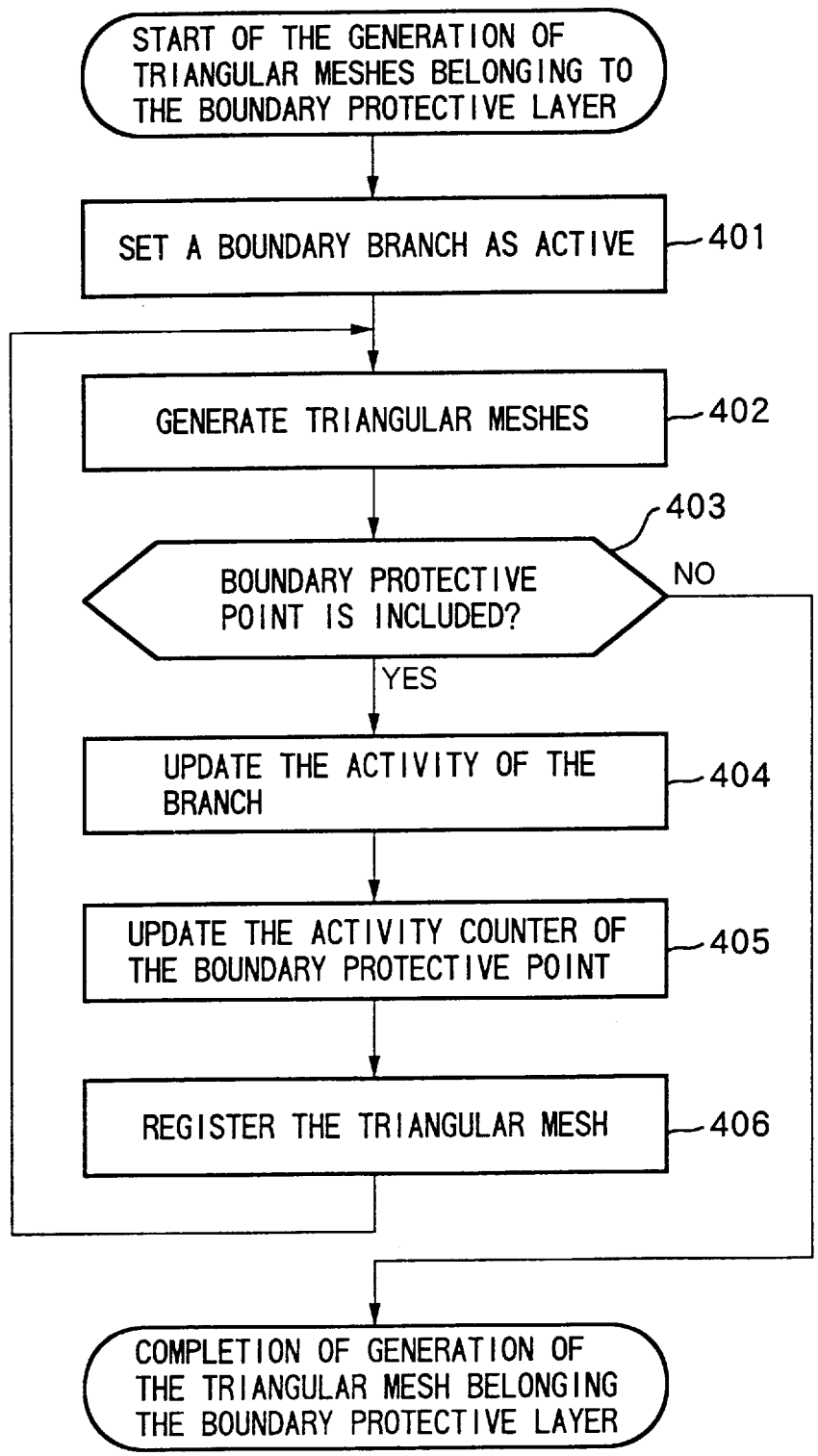
FIG. 5 is a flow chart showing another example of a mesh generation method of the embodiment.

FIG. 5 is a flow chart indicating another example of the operation of generating the triangular mesh restrictively in the region where the boundary protective layer may be destroyed, according to the embodiment. The triangular mesh generation is repeated until the initial mesh including no boundary protective point is generated, while making use of the characteristic of the boundary protective layer.

Referring to FIG. 5, the operation from Step 401 to Step 406 is the same as that from Step 301 to Step 306 in FIG. 4 as mentioned above. This operational example does not involve the step of judging the presence of the boundary protective point whose activity counter value is not "0" after Step 406 in which a triangular mesh is registered as the triangular mesh to be checked and after Step 403 in which the triangular mesh is judged not to include the boundary protective point. After the triangular mesh is registered as the triangular mesh to be checked in Step 406, the operation returns to Step 402, where the triangular mesh is generated, and in Step 403, it is judged whether or not the generated triangular mesh includes the boundary protective point. If the triangular mesh is judged not to include the boundary protective point, the triangular mesh generation will be completed.

The mesh points forming the boundary protective layer exists in the range at a certain distance from the material boundary. Taking advantage of this characteristic, when the triangular mesh is generated from the vicinity of the material boundary toward the inner portion of the region in a spiral way, the triangular mesh including the boundary protective point is first completed. Accordingly, the first generation of the triangular mesh including no boundary protective point proves that every triangular mesh generation including the boundary protective point has been completed.

In the triangular mesh generation method of this operation example, however, the triangular mesh is not generated on the sub-domain point, but there may remain the wedge-shaped space in some cases. In this embodiment, however, since the mesh point positioning unit 20 restricts the arrangement of the mesh points in the vicinity of the sub-domain point as mentioned above, the boundary protective layer cannot be destroyed in this portion. Therefore, it is not necessary to judge whether or not every triangular mesh generation including the boundary protective point has been completed, while making use of the activity, similarly to the triangular mesh generation method as shown in FIG. 4 (Step 307), thereby shortening much time spent on the processing.

Figure 6:
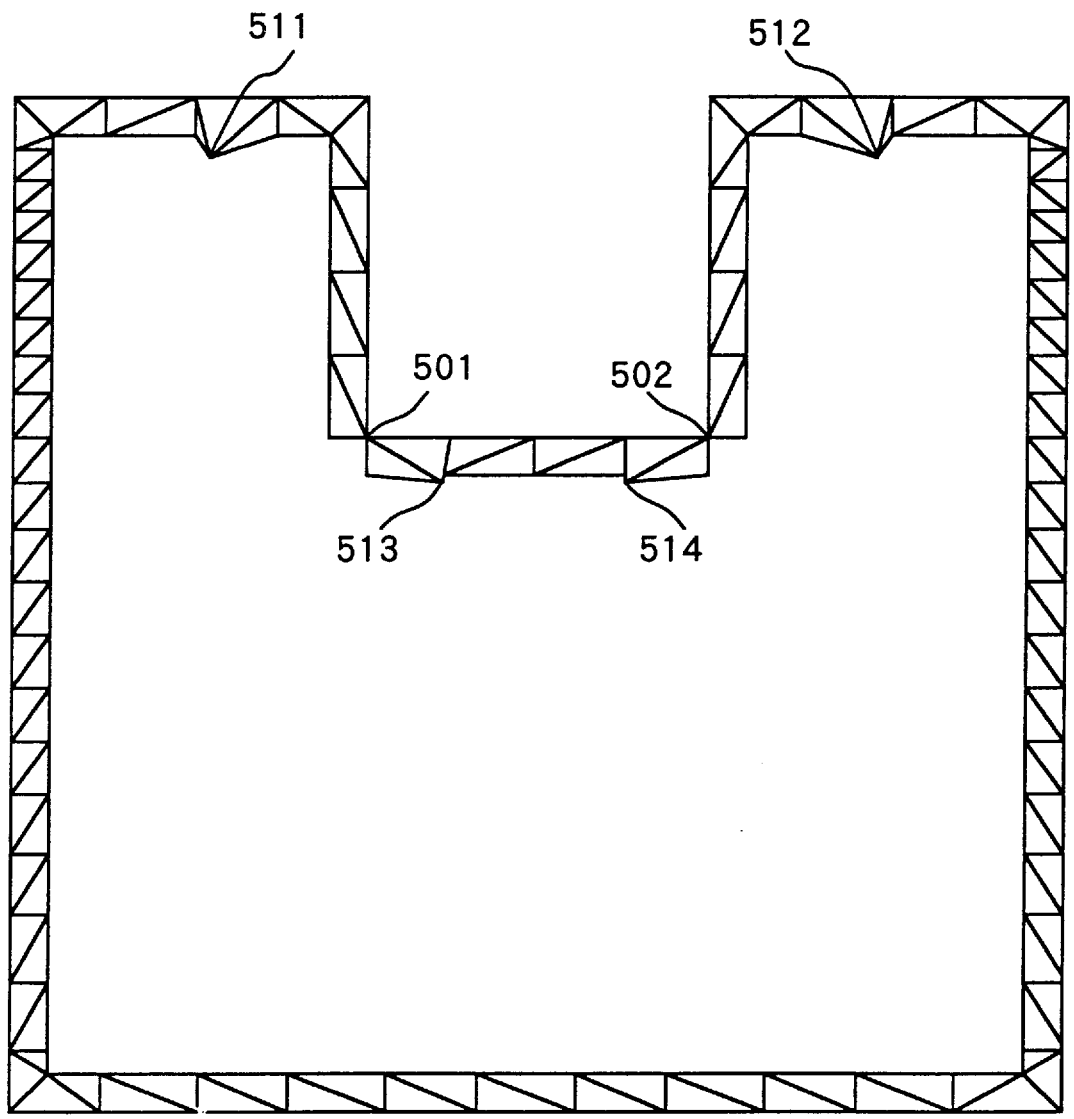
FIG. 6 is a view showing the result of generating triangular meshes in the restricted region where the boundary protective layer may be destroyed, according to the embodiment.

FIG. 6 is a view showing an example of the result of generating the triangular mesh restrictively in the region where the boundary protective layer may be destroyed, according to the embodiment.

As shown in FIG. 6, the triangular meshes having branches connecting the boundary protective points with the mesh points 511, 512, 513, 514 respectively destroy the boundary protective layer because the boundary protective points are connected with the within-region mesh points respectively. Although the mesh generation is not performed on the mesh points 501 and 502 which are the sub-domain points, the mesh points destroying the boundary protective layer have been eliminated in the vicinity of the sub-domain points, so that no destruction occurs there.

Figure 12:
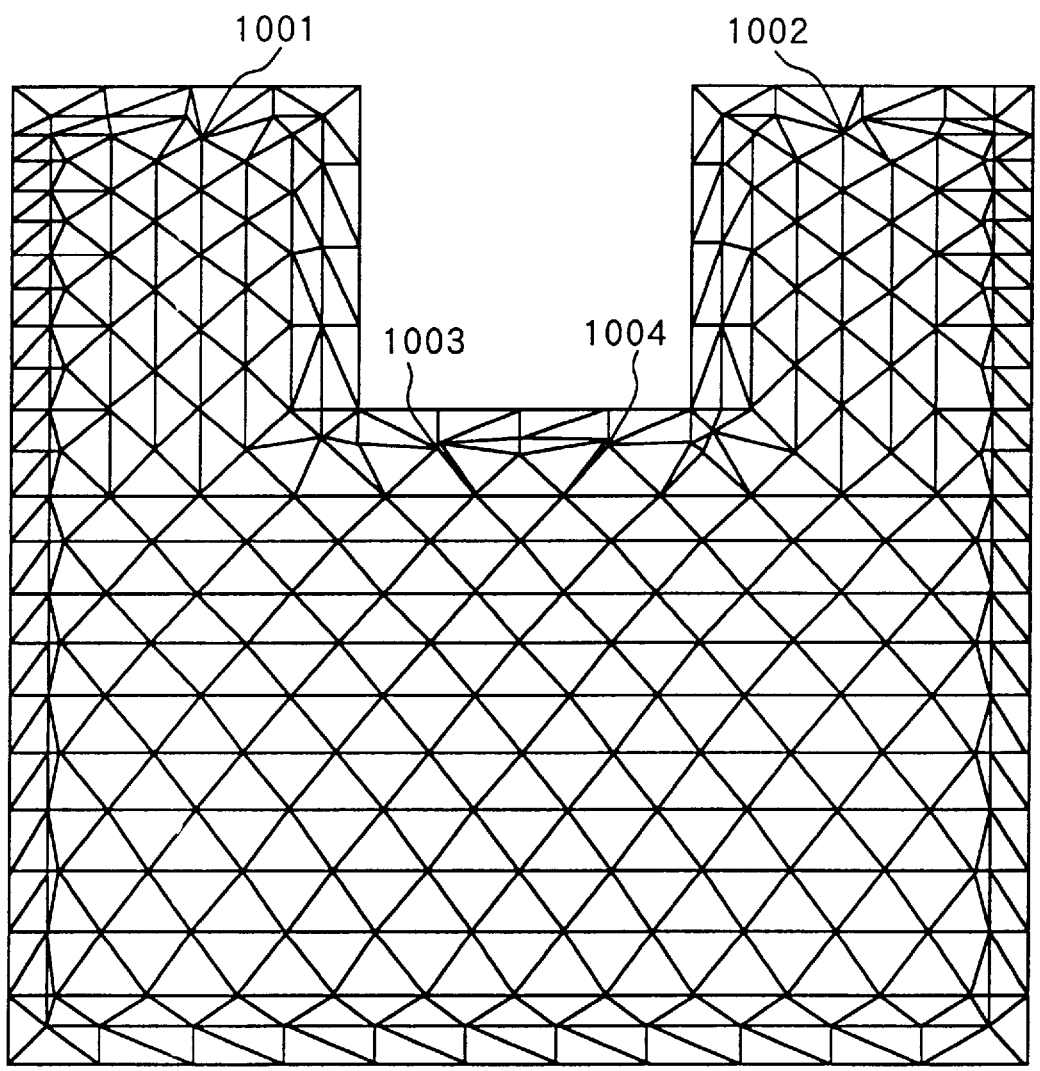
FIG. 12 is a view showing the result of generating triangular meshes according to the conventional art.
Figure 13:
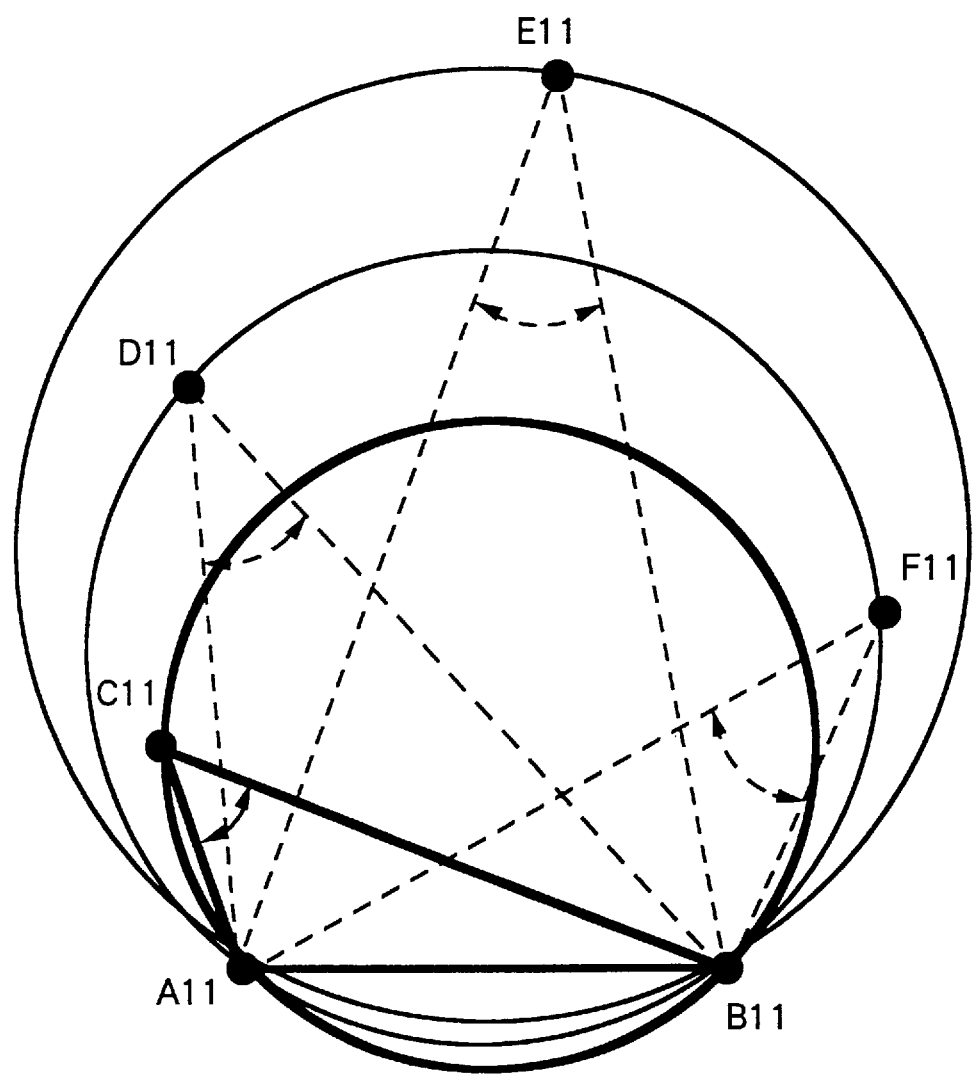
FIG. 13 is a view for use in describing a triangular mesh generation method.

In the conventional technique, some triangular meshes destroying the boundary protective layer are searched, after the triangular meshes have been generated all over the region. Therefore, when there exist some triangular meshes destroying the boundary protective layer such as the triangular meshes having branches respectively connecting the boundary protective points with the mesh points 1001, 1002, 1003, 1004, as shown in FIG. 12, all the generated triangular meshes of FIG. 12 are cancelled and the triangular meshes must be generated anew, which is a useless processing.

On the contrary, according to the embodiment, some triangular meshes destroying the boundary protective layer are searched, after having generated triangular meshes restrictively in the region where the boundary protective layer may be destroyed, as illustrated in FIG. 6. Therefore, when there exist some triangular meshes destroying the boundary protective layer, such as the triangular meshes having branches connecting the boundary protective points with the mesh points 511, 512, 513, 514 respectively, only the restrictively generated triangular meshes in the region where the boundary protective layer may be destroyed are to be destroyed, thereby eliminating the useless processing that is the repetition of the generation of the triangular meshes impossible to destroy the boundary protective layer.

Figure 7:
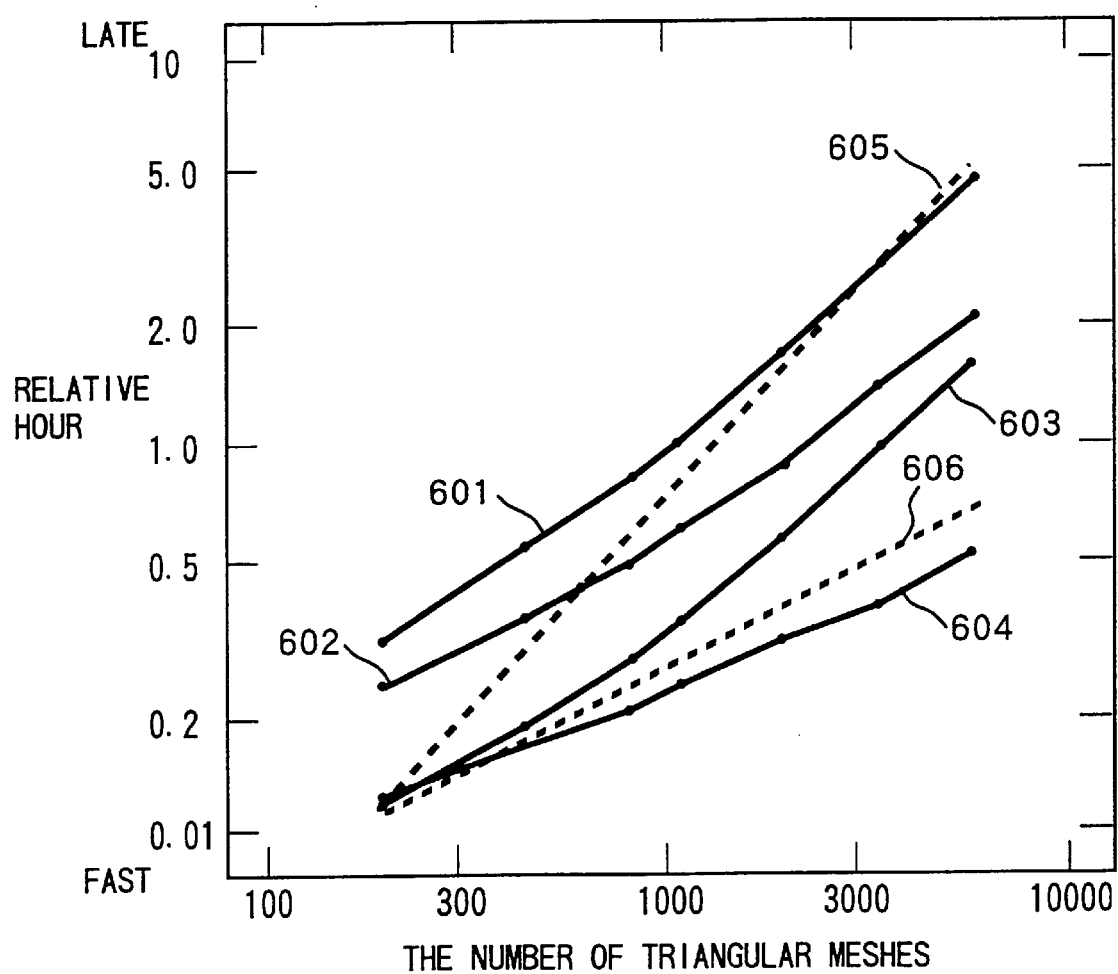
FIG. 7 is a chart showing a comparison between the embodiment and the conventional technique on the speed of generating triangular meshes having a boundary protective layer.

FIG. 7 is a view showing a comparison between the embodiment and the conventional technique on the speed of generating the triangular meshes relative to the boundary protective layer. It shows the ratio of the processing time between the embodiment and the conventional technique, in which the time spent on the triangular mesh generation in the case of one boundary protective layer is compared therebetween, with the processing time of the conventional technique fixed as "1", under the same condition. It shows the case where there are two times of destruction of the boundary protective layer and three times of the generation of the triangular meshes during the process of the triangular mesh generation.

In the solid lines of FIG. 7, the line 601 shows the time of the triangular mesh generation according to the conventional technique, and the line 602 shows the time of the triangular mesh generation according to this embodiment. The lines 603 and 604 pertain to the two stages of processing in the triangular mesh generation according to the present embodiment. The line 603 shows the time spent on generating the triangular meshes in the inner portion of the region as the second stage. The line 604 shows the time spent on restrictively generating the triangular meshes only in the region where the boundary protective layer may be destroyed as the first stage. The processing time in the case where the number of the triangular meshes is 1000 in the conventional technique, is fixed as a reference.

The broken line 605 in FIG. 7 indicates the slant of $O(Nm)$ in the case where the number of meshes is regarded as Nm and the broken line 606 indicates the slant of $O(\sqrt{Nm})$. As indicated by the solid line 601, the larger the number of triangular meshes, the longer the generation time in the generation process of the triangular meshes according to the conventional technique, so that the slant of this line is almost in accord with the slant of the broken line 605. As indicated by the solid line 604, the processing time in the case of generating triangular meshes restrictively in the region where the boundary protective layer may be destroyed according to the embodiment, is almost in accord with the slant of the broken line 606, because the actual number of the generated triangular meshes "$Nm_{new}$" is represented as "$Nm_{new} \propto C\sqrt{Nm}$".

The time required until the triangular meshes have been completely generated in the region of the semiconductor according to the embodiment, is nearly in accord with the slant of $O(\sqrt{Nm})$ because the load of the processing of generating the triangular meshes in the region other than the boundary protective layer according as the number of the triangular meshes increases.

As set forth hereinabove, in the mesh generation device and its method of the present invention, the process of the triangular mesh generation is divided into two stages. As the first stage, the triangular meshes are generated restrictively in the region where the boundary protective layer may be destroyed, and then some triangular meshes destroying the boundary protective layer are searched. If necessary, the triangular mesh generation of the first stage will be performed again until there exists no triangular mesh destroying the boundary protective layer. Then, as the second stage, the triangular meshes are generated in the remaining region, thereby completing the mesh generation. Therefore, when there exist some triangular meshes destroying the boundary protective layer, so that there is a necessity for regenerating the boundary protective layer and the triangular meshes in order to eliminate the destructive triangular meshes, only the triangular meshes in the region where the boundary protective layer may be destroyed, that are generated in the first stage, must be regenerated. The repetition of the triangular mesh generation in the region where the boundary protective layer may be destroyed is not performed in the second stage. Accordingly, the present invention can speed up the processing of generating the triangular meshes having the boundary protective layer by saving the useless processing, with the improvement in efficiency.

Especially, in the simulation requiring the generation of a large amount of triangular meshes according to the change of the configuration of the device region to be processed, like the oxidation process, the simulation time can be significantly shortened.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalent to the feature set out in the appended claims.

What is claimed is:

1. A mesh generation device for generating meshes in the region of a semiconductor device to be processed, comprising:

a boundary protective layer generating means for generating a boundary protective layer and positioning necessary mesh points in the vicinity of a boundary in the semiconductor device;

a mesh point positioning means for generating mesh points within the region of the semiconductor device at the position apart from the boundary protective layer by at least a predetermined reference distance;

a triangular mesh generating means for generating triangular meshes through the connection between the mesh points positioned by said boundary protective layer generating means and said mesh point positioning means; and a triangular mesh checking means for checking whether or not the triangular meshes generated by said triangular mesh generating means destroy the boundary protective layer; wherein said triangular mesh generating means processing of the triangular meshes in two stages, wherein in a first stage the triangular meshes are restrictively generated in the region where the boundary protective layer may be destroyed by some triangular meshes, and in a second stage the triangular meshes as generated in the remaining region, and said triangular mesh checking means checking whether or not the generated triangular meshes are destroying the boundary protective layer after the completion of the processing in the first stage by said triangular mesh generating means.

2. A mesh generation device as set forth in claim 1, wherein when it is judged that a triangular mesh destroying the boundary protective layer exists as the result of checking by said triangular mesh checking means, said boundary protective layer generating means projects the mesh point which does not form the boundary protective layer, of the mesh points of the triangular mesh, on a boundary protective line forming the boundary protective layer, so as to set a new mesh point, and when a new mesh point is set by said boundary protective layer generating means, said triangular mesh generating means destroys the triangular meshes checked by said triangular mesh checking means and newly generates triangular meshes according to the processing of the first stage.

3. A mesh generation device as set forth in claim 1, wherein said triangular mesh generating means, as the first stage of processing, selects a branch to set an activity one after another in a spiral way from any branch forming the boundary segment on the boundary of the semiconductor device toward the inside, restrictively in the region where the boundary protective layer may be destroyed by a triangular meshe, and generates triangular meshes including the selected branches one after another until there exists no branch with the activity set thereon.

4. A mesh generation device as set forth in claim 1, wherein said triangular mesh generating means, as the first stage of processing, selects a branch one after another in a spiral way from any branch forming the boundary of the semiconductor device toward the inside, and generates triangular meshes including the selected branches one after another until the first generation of the triangular meshes include none of the mesh points forming the boundary protective layer.

5. A mesh generation device as set forth in claim 1, wherein said mesh point positioning means positions mesh points in the vicinity of a sub-domain point on a given condition determined according to the type of the sub-domain point and the structure of the boundary protective layer.

6. A mesh generation device as set forth in claim 1, wherein said mesh point positioning means positions mesh points in the vicinity of a sub-domain point on a given condition determined according to the type of the sub-domain point and the structure of the boundary protective layer, and said triangular mesh generating means, as the first stage of processing, selects a branch one after another in a spiral way from any branch forming the boundary segment on the boundary of the semiconductor device toward the inside, and generates triangular meshes including the selected branches one after another until the first generation of the triangular meshes include none of the mesh points forming the boundary protective layer.

7. A mesh generation method executed by a mesh generation device comprising a boundary protective layer generating means for setting a boundary protective layer consisting of local orthogonal meshes and positioning necessary mesh points in the vicinity of a boundary of a semiconductor device to be processed, a mesh point positioning means for positioning mesh points within the region surrounded by the boundary protective layer of the semiconductor device, a triangular mesh generating means for generating triangular meshes by connecting the mesh points together, and a triangular mesh checking means for checking whether or not the generated triangular meshes destroy the boundary protective layer, the method comprising:

a first step of said boundary protective generation means generating the boundary protective layer and positioning necessary mesh points in the vicinity of the boundary of the semiconductor device;

a second step of said mesh point positioning means generating mesh points within the region of the semiconductor device at the position apart from the boundary protective layer by at least a predetermined reference distance;

a third step of said triangular mesh generating means generating triangular meshes through the connection between the mesh points positioned by said boundary protective layer generating means and said mesh point positioning means, restrictively in the region where the boundary protective layer may be destroyed by some triangular meshes;

a fourth step of said triangular mesh checking means checking whether the triangular meshes generated by said triangular mesh generating means are destroying the boundary protective layer; and a fifth step of said triangular mesh generating means generating triangular meshes in the remaining region of the semiconductor device in the case of no detection of any triangular meshes destroying the boundary protective layer as the result of checking by said triangular mesh checking means.

8. A mesh generation method as set forth in claim 7, further comprising a sixth step in which, when a triangular mesh destroying the boundary protective layer is detected as the result of checking by said triangular mesh checking means, said boundary protective layer generating means projects the mesh point which does not form the boundary protective layer, of the mesh points of the detected triangular mesh, on a boundary protective line forming the boundary protective layer, so as to set a new point, the method in which the process from the first step is repeated after executing the sixth step.

9. A mesh generation method as set forth in claim 7, wherein the third step by said triangular mesh generating means comprising a step of selecting a branch to set an activity one after another in a spiral way from any branch forming the boundary segment on the boundary of the semiconductor device toward the inside, restrictively in the region where the boundary protective layer may be destroyed by a triangular mesh, a step of generating triangular meshes including the selected branches, and a step in which it is judged whether or not there remain the branches with the activity set thereon, and if an activity remains, the process is returned to the step of generating triangular meshes, and alternatively, if not, the generation processing of the triangular meshes has been completed.

10. A mesh generation method as set forth in claim 7, wherein the third step by said triangular mesh generating means comprising a step of selecting a branch one after another in a spiral way from any branch forming the boundary of the semiconductor device toward the inside, a step of generating triangular meshes including the selected branches, and a step in which it is judged whether or not there are generated the triangular meshes each including no mesh point forming the protective boundary layer, if such triangular meshes are not generated, the process is returned to the step of generating triangular meshes, and alternatively, if generated, the generation processing of the triangular meshes has been completed.

11. A computer readable memory storing a computer program controlling a computer system which realizes a mesh generation device comprising a boundary protective layer generating unit for setting a boundary protective layer consisting of local orthogonal meshes and positioning mesh points in the vicinity of a boundary of a semiconductor device to be processed, a mesh point positioning unit for positioning mesh points within the region surrounded by the boundary protective layer of the semiconductor device, a triangular mesh generating unit for generating triangular meshes by connecting the mesh points together, and a triangular mesh checking unit for checking whether or not the generated triangular meshes destroy the boundary protective layer, wherein the computer program comprises:

a first step of said boundary protective generation unit generating the boundary protective layer and positioning mesh points in the vicinity of the boundary of the semiconductor device;

a second step of said mesh point positioning unit generating mesh points within the region of the semiconductor device at the position apart from the boundary protective layer by at least a predetermined reference distance;

a third step of said triangular mesh generating unit generating triangular meshes through the connection between the mesh points positioned by said boundary protective layer generating unit and said mesh point positioning unit, restrictively in the region where the boundary protective layer may be destroyed by a triangular mesh;

a fourth step of said triangular mesh checking unit checking whether the triangular meshes generated by said triangular mesh generating unit are destroying the boundary protective layer; and a fifth step of said triangular mesh generating unit generating triangular meshes in the remaining region of the semiconductor device in the case of no detection of any triangular meshes destroying the boundary protective layer as the result of checking by said triangular mesh checking unit.

12. The computer program stored in the computer readable memory as set forth in claim 11, further comprising a sixth step in which, when a triangular mesh destroying the boundary protective layer is detected as the result of checking by said triangular mesh checking unit, said boundary protective layer generating unit projects the mesh point which does not form the boundary protective layer, of the mesh points of the detected triangular mesh, on a boundary protective line forming the boundary protective layer, so as to set a new point, the program in which the process from the first step is repeated after executed the sixth step.

13. The computer program stored in the computer readable memory as set forth in claim 11, wherein the third step by said triangular mesh generating unit comprising a step of selecting a branch to set an activity one after another in a spiral way from any branch forming the boundary segment on the boundary of the semiconductor device toward the inside, restrictively in the region where the boundary protective layer may be destroyed by a triangular mesh, a step of generating triangular meshes including the selected branches, and a step in which it is judged whether or not branches remain with the activity set thereon, and if the activity remains, the process is returned to the step of generating triangular unit, and alternatively, if not, the generation processing of the triangular meshes has been completed.

14. The computer program stored in the computer readable memory as set forth in claim 11, wherein which the third step by said triangular mesh generating unit comprising a step of selecting a branch one after another in a spiral way from any branch forming the boundary of the semiconductor device toward the inside, a step of generating triangular meshes including the selected branches, and a step in which it is judged whether or not there are generated the triangular meshes each including no mesh point forming the protective boundary layer, if such triangular meshes are not generated, the process is returned to the step of generating triangular meshes, and alternatively, if generated, the generation processing of the triangular meshes has been completed.

\* \* \* \* \*